United States Patent [19]

Nara et al.

[11] Patent Number: 4,766,294
[45] Date of Patent: Aug. 23, 1988

[54] PORTABLE MEDIUM

[75] Inventors: Seietsu Nara, Yokohama; Katsuhisa Hirokawa, Yokosuka; Kenichi Kobayashi, Tokyo, all of Japan

[73] Assignee: Kabushiki Kaisha Toshiba, Kawasaki, Japan

[21] Appl. No.: 89,998

[22] Filed: Aug. 27, 1987

[30] Foreign Application Priority Data

Aug. 29, 1986 [JP] Japan .................................. 61-203358
Aug. 29, 1986 [JP] Japan .................................. 61-203360

[51] Int. Cl.$^4$ .............................................. G06K 5/00
[52] U.S. Cl. ...................................... 235/380; 235/492
[58] Field of Search ................................. 235/380, 492

[56] References Cited

U.S. PATENT DOCUMENTS 4,724,310 2/1988 Shimamura ..................... 235/492 X Primary Examiner—Harold I. Pitts
Attorney, Agent, or Firm—Cushman, Darby & Cushman

[57] ABSTRACT

An IC card, as a portable medium, has an oscillator for generating a low-frequency clock signal for time-piece. A display clock for display is provided for counting the clock signal. The time based on a count carried out by the display clock is displayed on the IC card a display section. In this case, the count of the display clock can be changed, as appropriate, by using keys on the keyboard provided on the IC card. The IC card also incorporates a transaction clock for counting the clock signal. The count carried out by this transaction clock is used to indicate the standard time. A count carried out by the transaction clock cannot be altered by use of the keys of the keyboard. The clock for time display may be the transaction clock allowing an access of the keyboard. The time for setting a term of validity and the key for encoding may be provided by the transaction clock rejecting an access by the keyboard and providing the time equal to that of other cards.

20 Claims, 7 Drawing Sheets

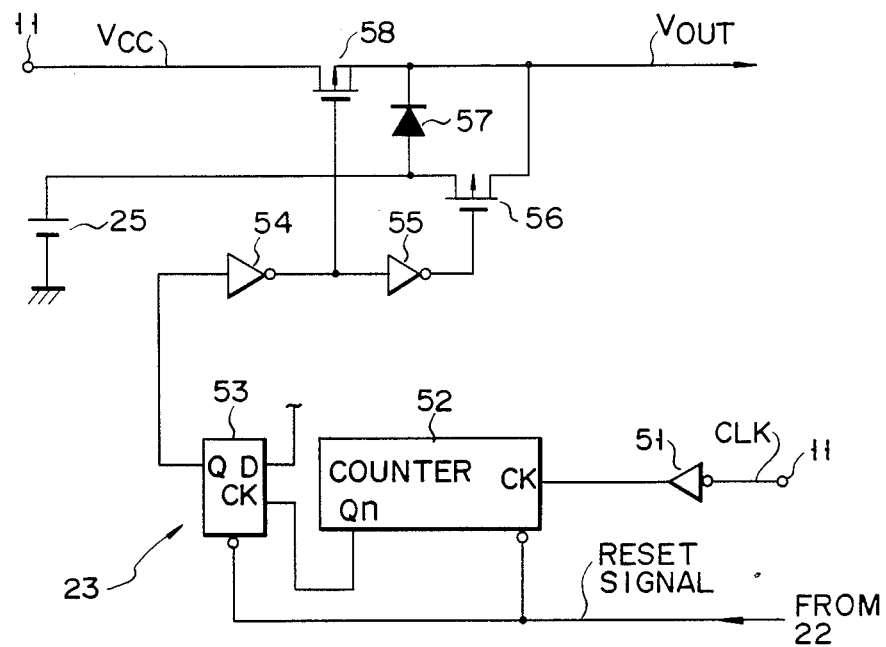
F I G. 4
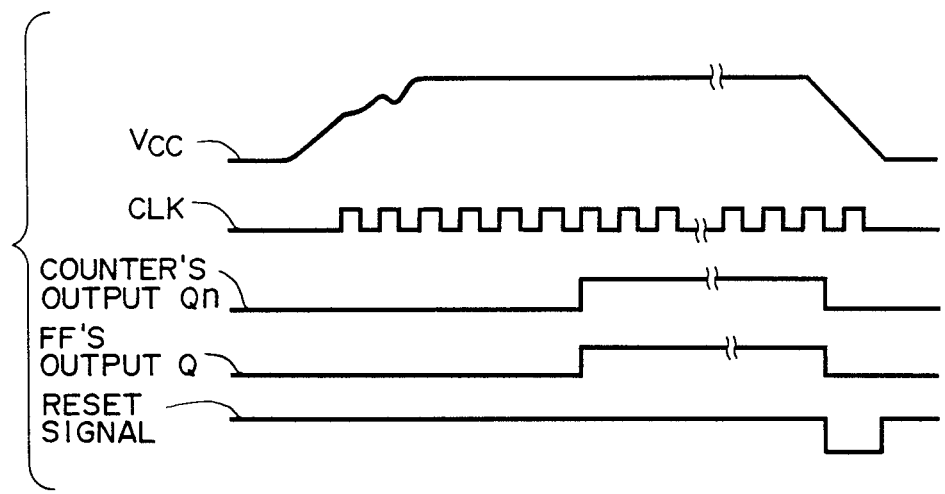
F I G. 5

PORTABLE MEDIUM

BACKGROUND OF THE INVENTION

This invention relates to a portable medium which contains a CPU, a data memory, and an internal battery, such as a multifunctional IC card which can display the time and can also be used as an electronic calculator.

Multi-function IC cards containing a CPU, a data memory, and an internal battery, have been developed. Such IC cards, when used solely, serves as electronic calculators based on the functions of keyboard and display or as time pieces. When set to the terminal devices, it can transfer data to and from the terminal devices.

In such IC cards, the card holder can set and change the time if necessary. This fact allows it to be used as time pieces such as wrist-watches.

In such IC cards, since the time set can be changed, it is impossible to limit the effective period of the use of the IC card by making use of time, or to use as the key for encoding. Therefore, since the cards have different set times, it is impossible to execute appropriate processings common to these cards by using the time data of the time piece.

Additionally, in this type of IC card, a clock signal for driving the CPU is generated by a single oscillator. In some type of IC cards, the CPU clock signal is always generated; however, in most IC cards, the CPU clock signal is generated only when the CPU is used, in order to conserve battery power.

To restart the stopped oscillator, a power-on switch specially provided on the keyboard or a switch equivalent to it is pushed. However, when the oscillator is re-started, it takes some time before it is operating stably. Consequently, a signal input from any key will not be accepted until the oscillator is operating stably, which is a drawback.

Furthermore, the number of keys is increased. Additionally, the current consumption is incompletely reduced.

SUMMARY OF THE INVENTION

Accordingly, an object of this invention is to provide a portable medium which can execute appropriate processing by using time data, for example, to limit the effective period of the card use, and to allow it to be used as the key for encoding.

Another object of this invention is to provide a portable medium which can accept a signal input from any key, even if the oscillator not yet operating stably.

A portable medium according to this invention comprises input means, display means for displaying the contents as input by the input means, control means for controlling the input means and the display means, first clock means for providing time, the time being displayed by the display means, change of the contents of the time by the input means being allowed, and second clock means for providing time, displaying of the time by the display means being prohibited, change of the contents of the time by the input means being prohibited.

BRIEF DESCRIPTION OF THE DRAWINGS

Other objects and features of this invention will be described referring to the accompanying drawings, in which:

FIG. 4 shows a circuit diagram of a power control circuit;

FIG. 5 shows a timing chart useful in explaining the operation of the key portion in FIG. 4;

DETAILED DESCRIPTION OF THE PREFERRED EMBODIMENTS

An embodiment of this invention will be described referring to the accompanying drawings.

Figure 1:
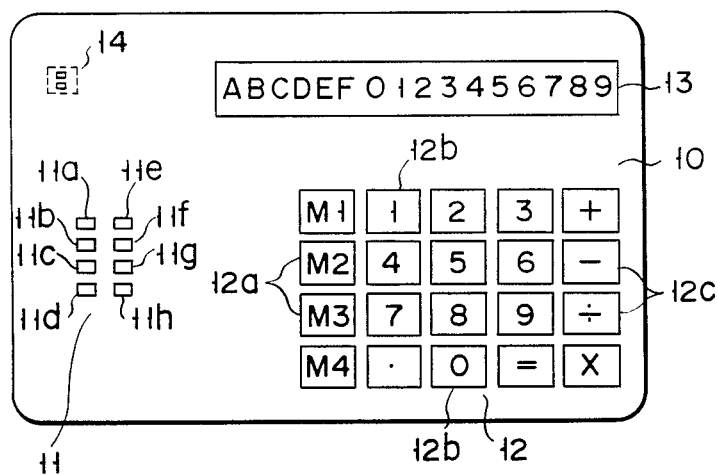
FIG. 1 shows a plan view of a configuration of the IC card.

In FIG. 1, reference numeral 10 shows an IC card as a portable medium, which is of the multifunction type. The functions or operation modes of the IC card are, for example, an on-line function used in connection with the terminal devices, an off-line function used when the IC card is used independently, not in connection with other devices, and a stand-by mode in which the IC cards counts time alone.

The off-line function contains many modes; a calculator mode, a time display mode for presenting time data to users, a time change mode for changing time when it is needed, an electronic pocketbook mode for the storage and read-out of addresses, names, telephone numbers, etc., and a credit card mode for purchasing articles. A contact section (connection means) 11 and a keyboard (input means) 12 with 20 keys are formed on the upper surface of IC card 10. The contact section 11 is placed at the location as specified by the related standards. Additionally, a display section (display means) 13 using liquid crystal display elements and a magnetism generating member 14 are disposed above keyboard section 12.

Contact section 11 includes a plurality of terminals 11a to 11h, for example. Terminal 11a is for power voltage (+5 V, Vcc) for operating the IC card device, 11b for grounding, 11c for clock signal, 11d for reset signal, 11e to 11h for inputting and outputting data.

Keyboard section 12 is made up of mode keys 12a (M1 to M4) for designating processing modes, ten keys 12b, and arithmetic operation keys 12c (function keys).

Mode keys 12a are used in the off-line mode, viz. when the processing is performed by only the IC card 10. In this mode, these keys are used for selecting a calculating mode (M1), a time display mode (M2), an electronic pocketbook mode (M3), and a purchasing mode (M4). The mode M4 is used for making the purchase at the terminal as specified by the magnetic strip on the IC card used. When the M2 key is pushed successively two times, the time change mode is selected. When the M4 key and ten keys 12b are combined, the purchasing mode is selected, which is performed in the off-line mode.

The display section 13 is a 16-digit display in which each figure comprises 5×7 dots arrayed in a matrix fashion.

The magnetism generating member 14 is buried in the IC card 10 in alignment with the track position of a magnetic card reader (magnetic head) in the reader unit (not shown).

Figure 2:
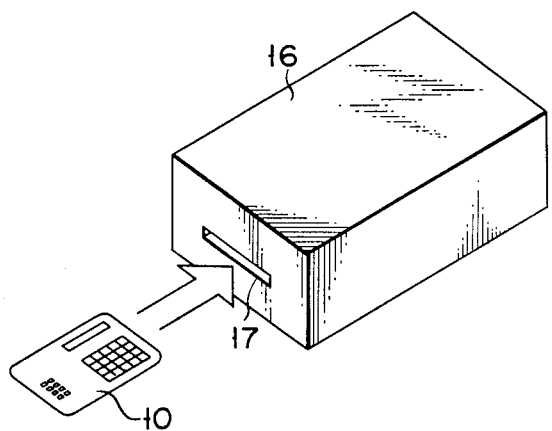
FIG. 2 shows an external view of terminal device handling IC cards.

FIG. 2 shows an external view of IC card read/write section 16 as terminal devices, which is used for terminals in use with, for example, personal computers. The IC card read/write section 16 contacts the contact section 11 when the card 10 is inserted and comes in through the card slit 17 of the IC card read/write section 16. Under this condition, the IC card read/write section 16 reads out of data in the memory (not shown) of IC card 10, and writes data into the memory. IC card read/write section 16 is connected to a main frame (not shown) of the personal computer by means of a cable.

Figure 3:
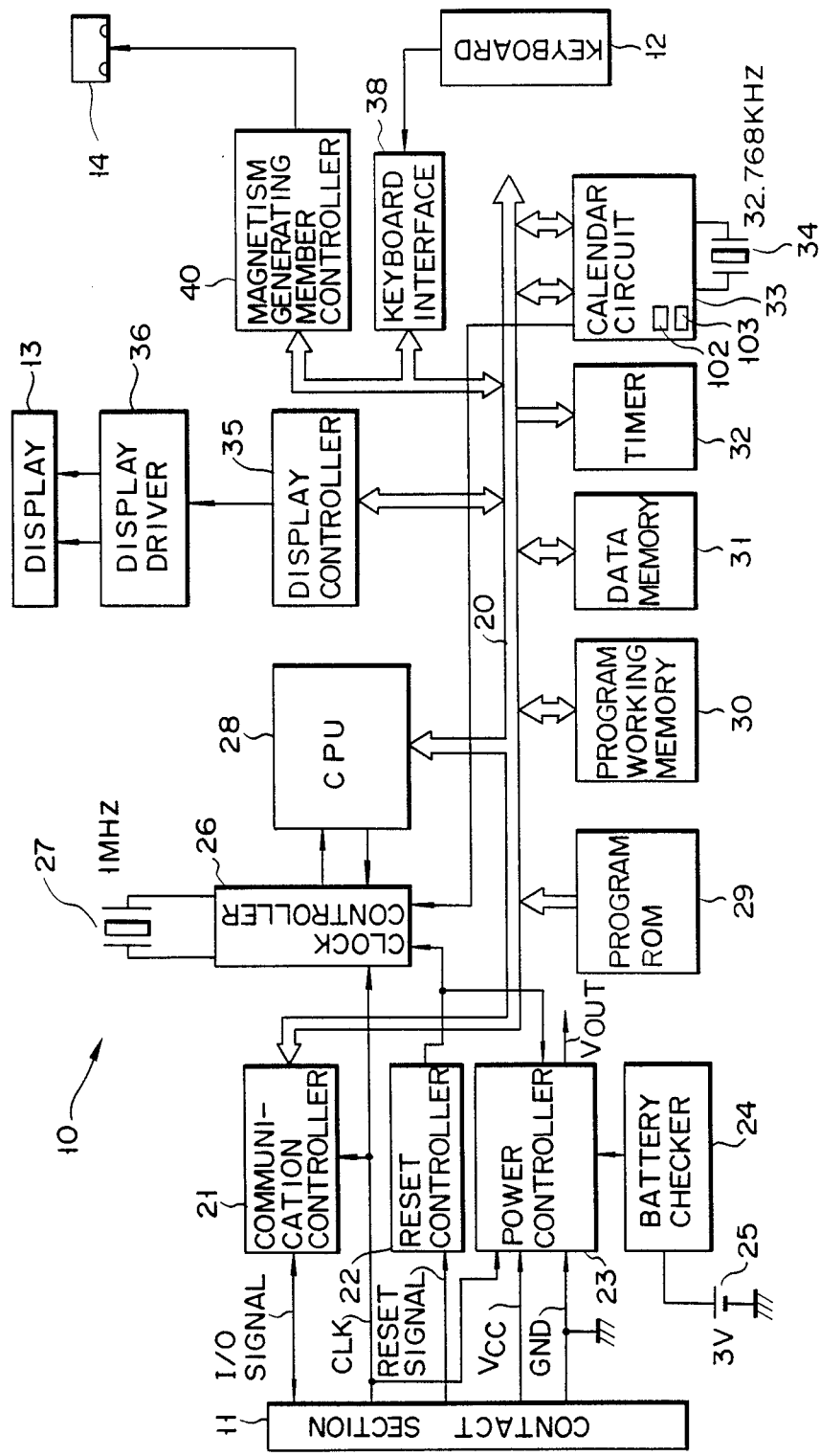
FIG. 3 shows a block diagram of an electrical circuit in the IC card.

The electrical circuit of IC card 10 is configured as shown in FIG. 3. As shown, IC card 10 includes contact section 11, communication controller 21, reset controller 22, and power controller 23. Internal battery (built-in power supply) 25 of 3 V, for example, and battery checker 24 are further included. Battery checker 24 checks as to whether or not the voltage value of internal battery 25 is above a predetermined value. The electrical circuit further includes clock control circuit 26, oscillator 27 for outputting a signal at oscillating frequency of 1 MHz, for example, and CPU 28 for control the circuit operations. Program ROM 29 for storing control programs, memory 30 for program working, and data memory 31, made up of a PROM, for storing a personal identification number of four digits, for example, and data are further included. The IC circuit further includes timer 32 for time counting during the data processing, calendar circuit 33, and oscillator (first clock generator) 34 including a resonator for the fundamental clock signal. The oscillator 34 constantly generates a signal at a low frequency of 32.768 KHz. The signal at the low frequency is used as time display clock signal. The circuit additionally includes display controller 35, driver 36 for driving display section 13, keyboard interface 38 as a key-in circuit of keyboard section 12, and magnetism generating member controller 40 for controlling the magnetism generating member 14.

Communication controller 21, CPU 28, ROM 29, program working memory 30, data memory 31, timer 32, calendar circuit 33, display controller 35, keyboard interface 38, and magnetism generating member controller 40 are interconnected by data bus 20.

Communication controller 21, when in the receiving mode, converts a serial input signal into a parallel data, and outputs to data bus 20. The serial input signal is supplied through contact section 11 from terminal device 16. In the transmitting mode, the same converts the parallel data from data bus 20 into a serial output signal, and outputs it via contact section 11 to terminal device 16. In this case, the format for that conversion is determined by terminal device 16 and IC card 10.

Reset controller 22 generates a reset signal when it is in the on-line mode, and drives CPU 28.

Power controller 23, when the on-line mode is set up, changes the power supply from internal battery 25 to the external battery, after a predetermined period of time. Further, in the off-line mode, when the external battery voltage drops, the power supply for the IC circuit is changed from the external battery as has been used till then to the internal battery 25.

In the off-line mode to execute the card operation by internal battery 25, when the IC card circuit is in the stand-by state, viz., it is waiting for some key-in operations, clock controller 26 stops the operation of oscillator circuit 67 (as described later), and also stops the supply of clock signal to CPU 28. In this way, the clock controller 26 waits for the key operations in a complete stopped state of the circuit.

When clock controller 26 receives some key-in signal from keyboard section 12, in other words, when oscillator circuit 67 as has been stopped is restarted, clock controller 26 causes oscillator circuit 67 to produce the time display clock signal as a clock signal for CPU 28, during a period from 500 to 600 msec till the oscillating operation of the oscillator is settled down, and causes CPU 28 to execute the operation, which is based on the key-in signal.

In the on-line mode, viz., when receiving the reset signal, clock controller 26 produces the time display clock signal as the clock signal for CPU 28, during the period of 500 to 600 msec till the oscillator operation settles down, and then the controller produces a signal at 1 MHz.

Data memory 31 stores the effective period of card usage. This period corresponds to the capacity of internal battery 25. The capacity of internal battery 25 is checked by battery check circuit 24. When the voltage of the battery drops below a predetermined voltage, battery check circuit 24 detects it and informs CPU 28 of the termination of the effective period of card usage. CPU 28 causes display section 13 to display information indicating the termination. This effective period may be set for the card per se, but for each of the registered credit card or cash card.

In the purchasing mode, the account number of the credit card and the limit of account of it when these are used in the off-line mode are recorded into data memory 31. The limit of account is changed every transaction. The transaction number resulting from the transaction is recorder into a transaction memory area (not shown) of the memory. The transaction number is an encoded data with encoding keys of the date for clock 102, the amount of purchasing, and the account number.

Calendar circuit 33 comprises clock for display (first clock means) 103 manually adjustable by a card holder and clock for transaction (second clock means) 102 in which the standard time such as the Greenwich time or standard time of a country is fixedly set in factory. Clock 102 is prohibited from displaying time by display section 13.

Display controller 35 converts the display data supplied from CPU 28 into a character pattern by a character generator (not shown) made up of an internal ROM. Then the controller drives display driver 36 and display section 13 to display the character pattern.

Keyboard interface 38 outputs to CPU 28 a key-in signal from the operated key on keyboard 12.

In the purchasing mode, magnetism generating member controller 40 drives magnetism generating member 14 to generate magnetism data according to the data supplied through data bus 20 and a drive rate depending on the manual or automatic type of the reader. With this feature, IC card 10 is operable like the conventional one with the magnetic stripe.

The power controller 23 will be described in details referring to FIG. 4. As is shown, power controller 23 is made up of inverters 51, 54 and 55, counter 52, D type flip-flop (FF) 53, semiconductor switches 56 and 58 made up of MOSFETs, and diode 57. Power controller 23 is connected to internal battery 25, through battery check circuit 24 (not shown in FIG. 4).

The count of counter 52 is not influenced by chattering of the external power supply. Diode 57 protects power voltage $V_{OUT}$. It keeps the power voltage $V_{OUT}$ by using internal battery 25, when the external power voltage Vcc drops below the drive voltage for the memory before semiconductor switch 56 is turned on.

The operation of the IC card thus arranged will be described referring to FIG. 5 illustrating a timing chart. When IC card 10 is not connected to terminal device 16 at contact section 11, semiconductor switch 56 is turned on. The power voltage of internal battery 25 is distributed as the output $V_{OUT}$ of power controller 22 to the related portions, via semiconductor switch 56.

When IC card 10 is connected to terminal device 16 at contact section 11, the external power voltage Vcc is supplied through contact section 11 to the gate of semiconductor switch 58. The clock signal CLK coming through contact section 11 from external is supplied to the clock terminal CK of counter 52, through inverter 51. Upon receipt of this, counter 52 starts its counting. When the count of counter 52 reaches a predetermined value, the output at output terminal Qn sets FF 53. The set output Q of FF circuit 53 places a "0" signal at the gate of semiconductor switch 58. A "1" signal is placed at the gate of semiconductor switch 56. Accordingly, semiconductor switch 58 is turned on, while switch 56 is turned off. The power voltage Vcc from external is applied as the output $V_{OUT}$ of power controller 22 to the related portions via semiconductor switch 58.

When the IC card is returned from the on-line mode to the off-line mode, if the power voltage Vcc drops, reset controller 22 produces a reset signal. This reset signal resets counter 52 and FF 53. Then, a "1" signal is supplied to the gate of semiconductor switch 58, and a "0" signal is supplied to the gate of semiconductor switch 56. Then, switch 58 is turned off and switch 56 is turned on. As a result, the power voltage of internal battery 25 is supplied as the output $V_{OUT}$ of power controller 22 to the related circuits, through semiconductor switch 56.

Figure 6:
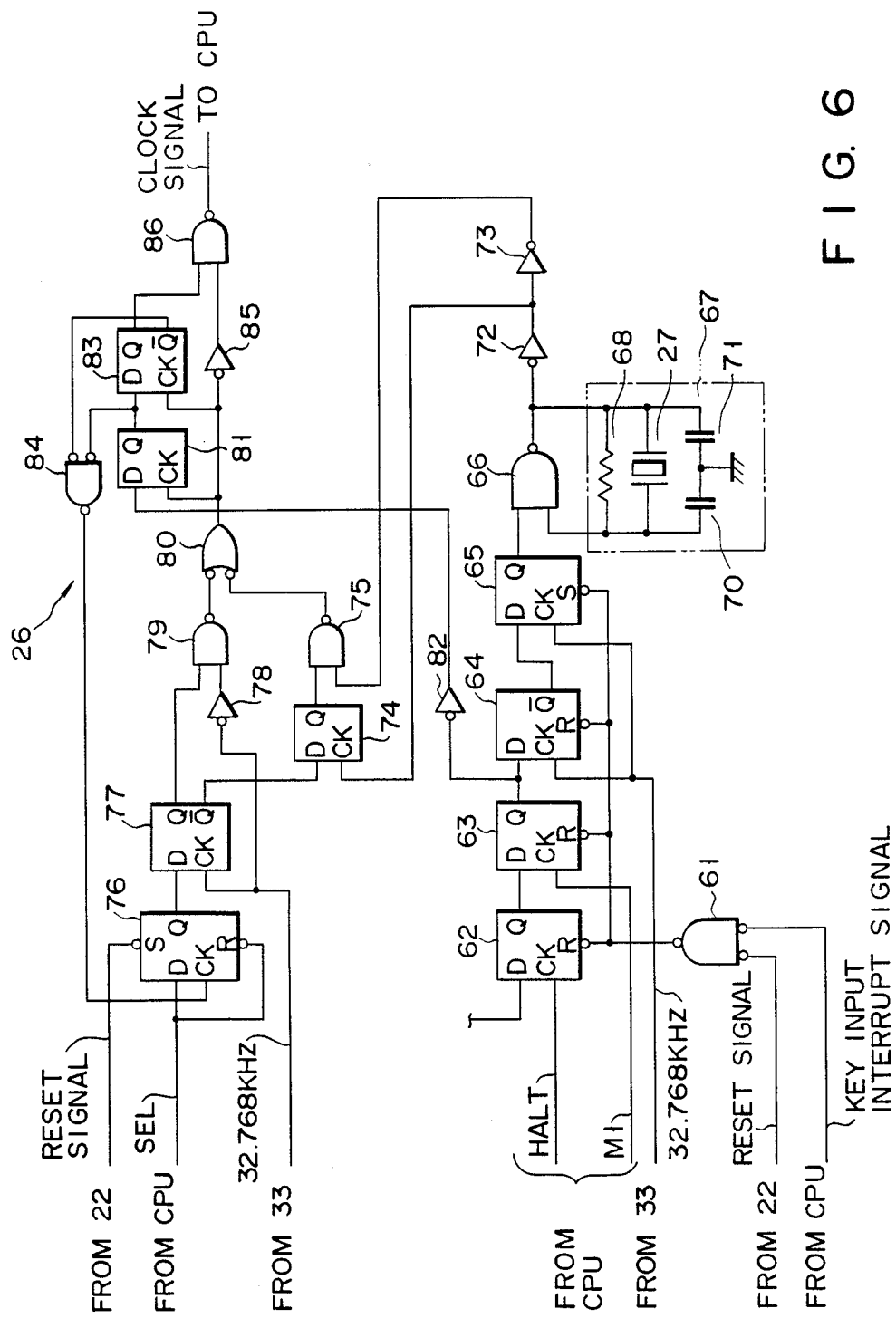
FIG. 6 shows a circuit diagram of a clock control circuit.

The clock controller 26 will be described referring to FIG. 6. Halt signal HALT derived from CPU 28 is supplied to the clock input terminal CK of FF 62. The set signal from FF 62 is supplied to the data input terminal D of FF 63. Machine cycle signal M1 is supplied to the clock input terminal CK of FF 63. FFs 62 and 63 are for halt mode timings.

The set output of FF 63 is supplied to the data input terminal D of FF 64. The clock input terminal CK of FF 64 is supplied with the time display clock signal at 32.768 KHz derived from calendar circuit 33. The reset output of FF 64 is supplied to the data input terminal D of FF 65. The clock input terminal CK of FF 65 is supplied with the time display clock signal at 32.768 KHz from calendar circuit 33. FF 65 is for stopping the clock oscillation.

The set output of FF 65 is supplied to one input terminal of NAND gate 66. Oscillator circuit 67 is connected to between the other input terminal and the output terminal of NAND gate 66.

A key-in interrupt signal from CPU 28 and a reset signal from reset controller 22 are supplied through OR gate 61 to the reset input terminals R of FFs 62 to 64, and further to the set input terminal S of FF 65.

Oscillator circuit 67 is made up of oscillator 27 of 1 MHz oscillating frequency, resistor 68, and capacitors 70 and 71.

The output of NAND gate 66 is supplied to the clock input terminal CK of FF 74, through inverter 72. The output of NAND gate 66 is supplied to one input terminal of NAND 75 via inverters 72 and 73.

The reset signal from reset controller 22 is supplied to the set input terminal S of FF 76, and the output signal from OR gate 84 is supplied to the clock input terminal CK of FF 76. Clock select signal SEL derived from CPU 28 is supplied to the data input terminal D and the reset input terminal of FF 76. The set output of FF circuit 76 is supplied to the data input terminal D of FF 77. The time display clock signal at 32.768 KHz is supplied to the clock input terminal CK of FF 77, from calendar circuit 33. The set output of FF 77 is supplied to one input terminal of NAND gate 79. The other input terminal of this gate is supplied with the time display clock at 32.768 KHz from calendar 33, through inverter 78. The output signal from NAND gate 79 is supplied to one input terminal of NAND gate 80.

The reset output of FF 77 is supplied to the data input terminal D of FF 74. The set output of FF 74 is supplied to the other input terminal of NAND gate 75. FF 74 is for clock selection.

The output signals from NAND gates 75 and 79 are supplied to NAND gate 80. The output of NAND gate 80 is supplied to the clock input terminal CK of FFs 81 and 83. The set output of FF 63 is supplied to the data input terminal D of FF 81, via inverter 82.

The set output of FF 81 and the reset output of FF 83 are supplied to the clock input terminal CK of FF 76, via OR gate 84.

The set output of FF 83 is applied to one input terminal of NAND gate 86. The other input terminal of NAND gate 86 is supplied with the output signal from NAND gate 80, through inverter 85. The output signal from NAND gate 86 is supplied to CPU 28, as a clock signal.

The operation of the clock controller 26 thus arranged will be described.

In the stand-by mode, CPU 28 supplies a "1" signal as clock select signal SEL. This signal sets FFs 76 and 77. The clock signal for time display (at 32.768 KHz) is led through inverter 78 and NAND gates 79 and 80 to FFs 81 and 83, and inverter 85.

To restart oscillator circuit 67 as has been halted, CPU 28 supplies a key-in interrupt signal. This signal resets FFs 62 to 64, and sets FF 65. The set output of FF 65 enables oscillator circuit 67. Then, oscillator circuit 67 starts its oscillation again.

Upon resetting of FF 63, a "1" signal is supplied to the data input terminal D of FF 81. The output signal of NAND gate 80 enables NAND gate 86, since FFs 81 and 83 are set. Therefore, as described above, the time display clock signal as led to inverter 85 through inverter circuit 78 and NAND gates 79 and 80, is output to CPU 28 through NAND 86.

At this time, 500 to 600 msec are usually used till the oscillation of oscillator circuit 67 settles down. For this reason, CPU 28 supplies a "0" signal as a clock select signal SEL to the data input terminal D of FF 76, after 500 to 600 msec since its outputting of the key-in interrupt signal. The signal SEL resets FFs 76 and 77, and a reset signal of FF 77, i.e., a "1" signal, is supplied to the data input terminal D of FF 74.

The clock signal (1 MHz) from oscillator circuit 67 is supplied to the clock input terminal CK of FF 74, via inverter 72.

Accordingly, FF 74 is set, so that NAND gate 75 is enabled. As a result, the clock signal (1 MHz) from oscillator 67 is output to CPU 28, through inverters 72 and 73, NAND gates 75 and 80, inverter 85, and NAND gate 86 in this order.

In this way, the clock select signal SEL is set to logical "0", the clock signal is changed from the time display clock to the high speed processing clock under the synchronism control by FF 74.

The description to follow is the details of setting up the stand-by mode following the data processing by the IC card. The clock select signal SEL is set to "1", and FFs 76 and 77 are set. The set output of FF 77, i.e. a "1" signal, is applied to NAND gate 79, enabling the same gate. The time display signal (32.768 KHz) is output to CPU 28, through inverter 78, NAND gates 79 and 80, inverter 85, and NAND gate 86 in this order.

As a result, the time display clock signal (32.768 KHz) is output to CPU 28.

The halt signal HALT is input to the clock input terminal CK of FF 62, from CPU 28. FF 62 is set, and the set output of FF 62 is input to the data input terminal D of FF 63. A machine cycle signal M1 from CPU 28 sets FF 63, and a "0" signal is supplied to the data input terminal D of FF 81. The set output of FF circuit 63 is delayed by two (2) pulses by FFs 81 and 83, and applied to NAND gate 86. By this signal, NAND gate 86 is disabled, to stop the transfer of the clock signal to CPU 28. Finally, the CPU 28 is in a halt state.

The set output of FF 63 is delayed by two pulses by FFs 64 and 65, and transferred to NAND gate 66. As a result, NAND gate 66 is disabled, and the oscillation by oscillator circuit 67 is stopped. In this way, the outputting of the clock signal to CPU 28 is halted and then oscillation circuit 67 is also halted.

In this way, clock controller 26 effectively selects the time display clock signal (32.768 KHz) or the 1 MHz clock signal, in order to assist the rise of oscillation of oscillator 27.

Figure 7:
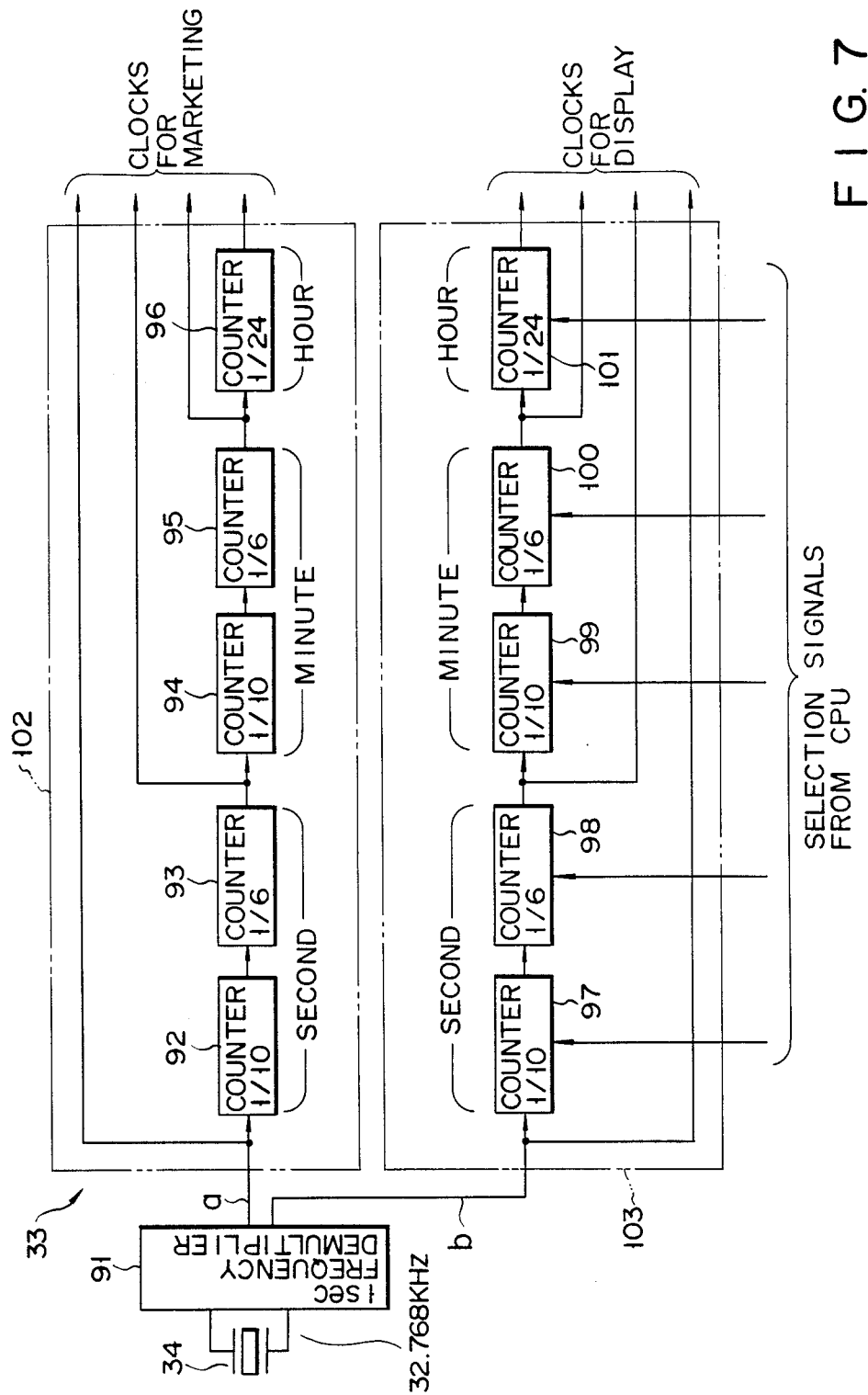
FIG. 7 shows a block diagram of a calendar circuit.

The calendar circuit 33 will be described referring to FIG. 7. Calendar circuit 33 is composed of frequency demultiplier 91 and counter 92 to 101. Frequency demultiplier 91 demultiplies the oscillation output signal of oscillator 34 at 32.768 KHz, and output signals every one second at output terminals a and b.

Counter 92 counts the signals from output terminal a of frequency demultiplier 91, and outputs signals every ten seconds. Counter 93 counts the signal from counter 92 and outputs signals every 60 seconds, or one minute. Counter 94 counts the signal from counter 93, and outputs signals every ten minutes. Counter 95 counts the signal from counter 94 and outputs signals every 60 minutes or one hour. Counter 96 counts the signal from counter 95 and outputs signals 24 hours or one day. The every-one-second signal from output terminal a of frequency demultiplier 91, the every-one-minute signal from counter 93, the every-one-hour signal from counter 95, and the every-one-day signal from counter 96 are supplied to data bus 20.

Counter 97 counts the signal from the output terminal b of frequency demultiplier 91, and outputs signals every ten seconds. Counter 98 counts the signal from counter 97, and outputs signals every 60 seconds or one minute. Counter 99 counts the signal from counter 98 and outputs signals every ten minutes. Counter 100 counts the signal from counter 99, and outputs signals every 60 minutes or one hour. Counter 101 counts the signal from counter 100, and outputs signals every 24 hours or one day. The every-one-second signal from output terminal b of frequency demultiplier 91, the every-one-minute signal from counter 98, the every-one-hour signal from counter 100, and the every-one-day signal from count 101 are supplied to data bus 20.

These counters 92 to 96 make up a transaction time clock (second time count means) 102 for counting second, minute and hour. Counters 97 to 101 make up a time display clock 103 for counting second, minute and hour. In this case, the count of each counter 97 to 101 can be changed by keyboard section 12. The set signal produced by the key-in operation is supplied to counters 97 to 101, from CPU 28. Counters 97 to 101 are set to the counts based on the set signals. The setting of the count values of these counters can be performed in the well known manner. The contents, i.e. the count, of counters 92 to 96 cannot be changed by keyboard section 12.

The signals of the 24-hour counters 96 and 101 can be used as the interrupt signals to CPU 28. Upon request by these signals, CPU 28 updates the date and day of the week in the corresponding area by using data memory 31.

When the date and days of the week are updated, CPU 28 reads out the effective period from data memory 31, and compares it with the date updated by counter 96, i.e. the date corresponding to clock 102. When it is found, as the result of comparison, that the effective period of the IC card expires, the data to prohibit use of the card is stored into data memory 31. In such a case, display section 13 displays the prohibition of card usage when the card is next used.

Figure 8:
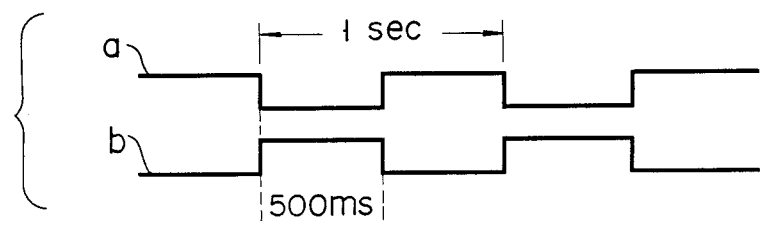
FIG. 8 shows a timing chart of the signals from a frequency dividing circuit.

Two clocks 102 and 103 have different phases of one second clock signal as is shown in FIG. 8, and this inhibits the concurrence of the interrupts.

Figure 9:
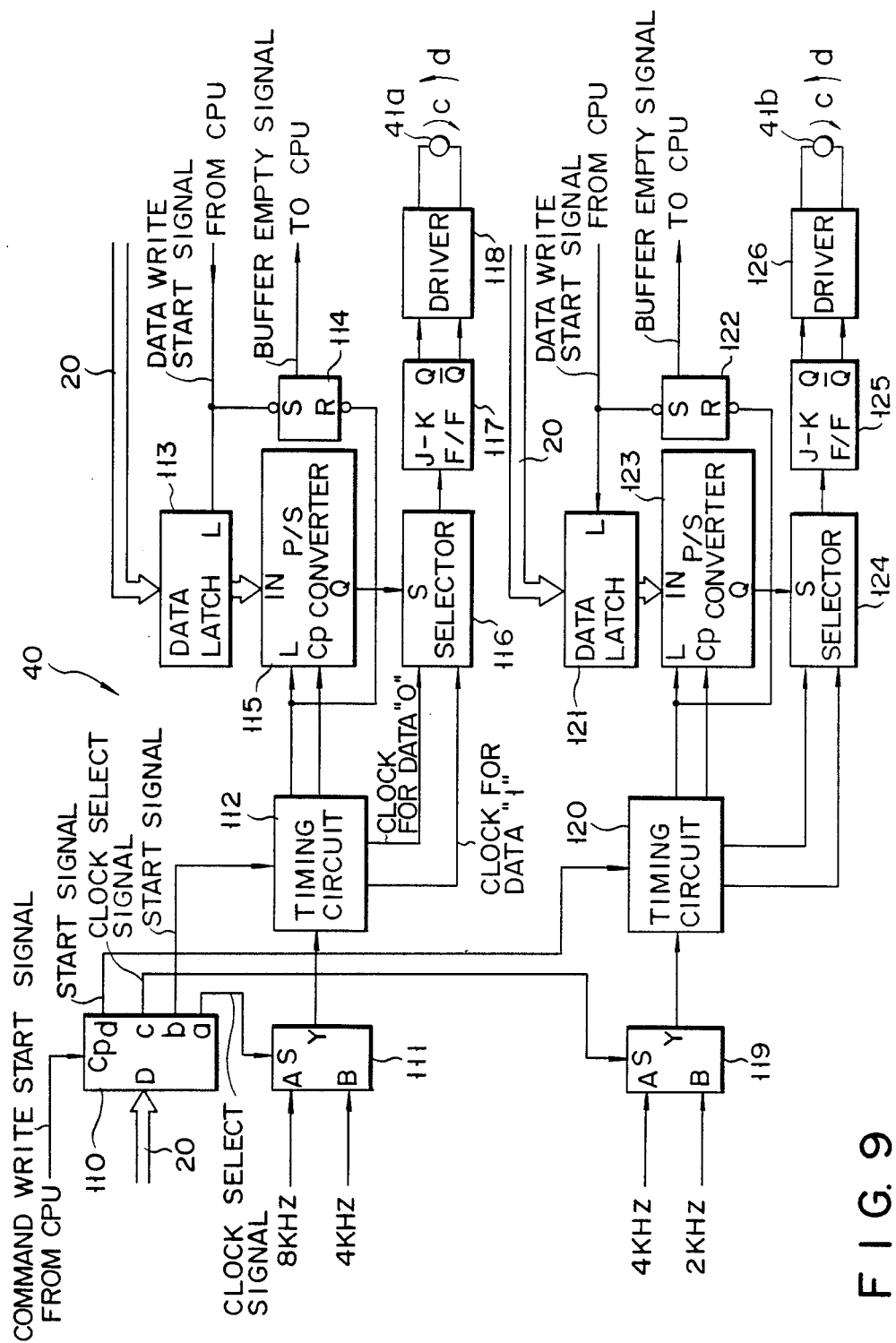
FIG. 9 shows a block diagram of a configuration of a controller for controlling a magnetism generating member.

The magnetism generating member controller 40 will be described in details referring to FIG. 9. The command data supplied through data bus 20 from CPU 28 is transferred to FF 110 for command. FF 110 is made up of four FFs, and outputs at the output terminal a a clock select signal corresponding to the drive rate for the first track, according to the command data supplied from data bus 20. The same produces a clock select signal corresponding to the drive rate for the second track at the output terminal c. A start signal is produced from output terminal d. The clock input terminal CP of FF 110 is supplied with a command write start signal from CPU 28. The clock select signal corresponding to drive rate represents if the terminal device is of the manual reader type or the automatic reader type.

The clock select signal from the output terminal a of FF 110 is supplied to the input terminal S of select circuit 111. The input terminal A of select circuit 111 is supplied with the signal at 8 KHz from the oscillator (not shown), while the input terminal B, with a 4 KHz signal from the oscillator (not shown). Select circuit 111 selects the signal from the terminal A or B according to the clock select signal of FF 110, and outputs the selected signal at the output terminal Y. When the type of the terminal device is of the manual type, the terminal A is selected, and it is output at the output terminal Y. When the type of terminal device is of the automatic reader type, the signal at the input terminal B is selected and output at the output terminal Y.

The start signal output from the output terminal b of FF 110, and the output signal from select circuit 111 are supplied to timing circuit 112. Timing circuit 112 generates a scale-of-7 clock signal, and supplies it to the clock input terminal CP of parallel/serial converter 115. The first clock signal is supplied as a load signal to the load input terminal L of parallel/serial converter 115. Timing circuit 112 supplies the clock signals for data "1" and "0" to selector 116.

The magnetic data supplied through bus 20 from CPU 28 is applied to data latch circuit 113. The data write start signal is supplied to data latch circuit 113, from CPU 28. Data latch circuit 113 latches the magnetic data each of 7 bits from data bus, when CPU 28 issues a data write start signal.

The data latched in data latch circuit 113 is supplied to the data input terminal IN of parallel/serial converter 115 for 7 bits. Upon receipt of the load signal supplied, this converter 115 fetches the data from data latch circuit 113, and shifts the fetched data into serial bit signals ("1" or "0" signal), and outputs them bit by bit in serial manner.

The output signal from the converter 115 is supplied to the input terminal S of selector 116. When the "1" signal is input to the input terminal S, selector 116 selects and outputs the clock signal for data "1" as supplied from timing circuit 112. When a "0" signal is input to the input terminal S, it selects and outputs the clock signal for data "0" as supplied from timing circuit 112. The output signal from selector 116 is applied to J-K FF 117. The set output and reset output of this J-K FF 117 are supplied to driver 118.

The driver 118 drives the magnetism generating member 41a in accordance with the signal from FF 117, and generates a magnetism. For example, when the FF 117 is set, a magnetism as indicated by arrow c is generated. When reset, the magnetism generated is as shown by arrow d.

Figure 10:
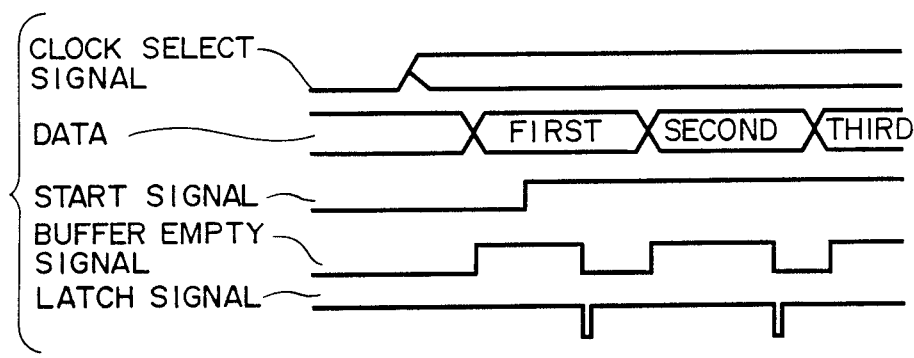
FIGS. 10 and 11 show timing charts useful in explaining the operation of the principal part in FIG. 9.

A timing chart of the signal at principal parts in magnetism generating member controller 40 is as shown in FIG. 10.

Figure 11:
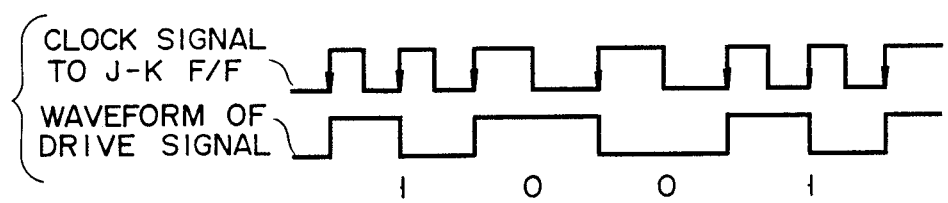

In selector 116, the clock cycles of data "1" and "0" are given at the ratio of 1:2, as shown in FIG. 11. By this clock, J-K FF 117 is operated in the inverted mode, to produce "1" and "0" signals as formatted necessary for the magnetic data, and the magnetism generating member 41a is driven by these signals.

The data write start signal from CPU 28 is inverted and input to the set input terminal S of FF 114 for empty detection. The first clock from timing circuit 112 is inverted and supplied to the reset input terminal R of FF 114. As a result, when the data from data latch circuit 113 is loaded into converter 115, FF 114 is set, and the set output or the buffer empty signal is sent to CPU 28.

Upon receipt of the buffer empty signal, CPU 28 decides that it is ready for the next data setting, and outputs the next data to data latch circuit 113. In this way, CPU 28 senses the output signal from empty detecting FF 114, and sets the data successively, and after all of data are output, it turns off the command write start signal and the data write start signal. As a result, the signal generation by timing circuit 112 is stopped, and the operation terminates.

These circuits 111 to 118 form a circuitry for the first track. Similarly, the circuitry for the second track is made up of select circuit 119, timing circuit 120, data latch circuit 121, empty detection FF 122, parallel/-serial converter 123, selector 124, J-K FF 125, and driver 126. The circuitry for the second track is different from the first track circuitry in that in the former, timing circuit 20 operates in the scale-of-5 mode.

The magnetism generating member controller 40 generates a magnetism according to the magnetic data of a given credit card as applied from CPU 28. The magnetic head (not shown) of the reader device is supplied with the same signal as that obtained when the conventional magnetic stripe is read out.

The operation of the IC card 10 thus arranged will be described. The off-line mode when the card is solely used will first be described. When the calculator mode is designated by mode key 12a, i.e., M1 key, the IC card can be used as an electronic calculator with ten keys 12b and the arithmetic keys 12c.

When mode key 12a, i.e., M2 key, is operated one time, CPU 28 reads out the data of second, minute, and hour for time display from the counters 97 to 101 in calendar circuit 33. Further, it reads out the data of the date and day of the week from data memory 31, and converts the format as specified, and outputs it to display controller 35. As a result, display controller 35 converts the data into the character pattern using the internal character generator (not shown), and displays it through display driver 36 and display section 13.

When mode key 12a or M2 key is pushed two times to designate the time change mode, the circuitry operates as in the time display mode, and displays the data of second, minute, hour, date and day of the week by display 13. Then, the setting and changing of these pieces of data are executed by ten keys 12b. CPU 28 changes the corresponding set contents, or the counts of counters 97 to 101, and the contents of data memory 31. In this case, what is to be changed is successively changed by operating mode key 12a.

When the pocketbook mode is designated by mode key 12a, i.e., M3 key, CPU 28 reads out the address, name, telephone number, and the like from data memory 31, and displays it by display section 13. When registering the address, names, and the like into the electronic pocketbook, ten keys 12b is used. Characters "A", "B", "C", "D", . . . can be designated by entering "1, 1", "1, 2", "1, 3", "2, 1", . . .

When mode key 12a or M4 key is used for designating the purchasing mode in which the magnetic stripe reading can be performed, the type of contacted credit card and the type of output terminals, i.e., the manual reader or automatic reader, can be selected in succession. Then, CPU 28 reads out the data (72 characters) corresponding to the selected credit, from data memory 31, and outputs it to magnetism generating member controller 40. CPU 28 outputs a drive rate, which is based on the selection of the automatic or manual reader, and applies it to controller 40. CPU 28 further outputs command data, command write start signal, and data write start signal to controller 40.

Responding to this, controller 40 generates a magnetism based on the magnetic data of the credit card from magnetism generating member 14. As a result, the same signal as read out the conventional magnetic stripe is supplied to the magnetic head (not shown) of the reader device. As a result, in the purchasing mode, the IC card 10 can be used as a conventional credit card.

When the off-line mode is designated by mode key 12a, i.e., M4 key, and ten keys 12b, CPU 28 decides that the off-line mode using the cash card is set up, and reads out the account number of the limit of transaction of the cash card from data memory 31. Then, the date and the amount for purchasing are entered by ten keys 12b. CPU 28 checks if the transaction is possible or impossible on the basis of the comparison result of these pieces of data. If the transaction is possible, CPU 28 encodes the account number, the date for the clock 102, and the amount, as the key, and writes the encoded data as the transaction data into the marketing recording area of data memory 31. CPU 28 displays the transaction number and the transaction permission by display section 13. The clerk writes the transaction number in the purchasing table, and transfers it to the card holder.

As a result, since the account number, date and amount lead to the transaction number, one can check if the purchasing, i.e., transaction, has been made or not.

The on-line function, which is operative when IC card 10 is inserted into terminal device 16, will be described. To begin with, IC card 10 is set to terminal device 16 through card slit 17. IC card 10 is set to the terminal device and the contact portion 11 is made in contact with the corresponding portion of terminal device 16. When the power voltage is externally supplied via contact portion 11, the power drive for power controller 23 is switched from the drive by internal battery 25 to the external power voltage. Reset controller 22 generates a reset signal which in turn drives CPU 28. After this drive, CPU 28 confirms that the IC card is in the on-line mode, and executes the on-line processing under control of program ROM 29. The on-line processing is such that by updating the data between terminal device 16 and IC card 10, the data exchange is performed, new data is written into IC card, and the like.

As described above, in the IC card as the portable medium according to this invention, the crystal resonator for the basic clock oscillator is used for multipurposes, and the two clock counters are used. One of the counters accepts the external setting of a numerical value from the keyboard. The other rejects such setting. With such an arrangement, the counter allowing the external numerical value setting can be used for display purposes. For the limiting of the validity of period and the key for encoding, the counter rejecting the external time setting from the keyboard is used common to other cards.

In the arrangement of the IC card according to this invention, to reduce the power dissipation by the card, the internal oscillator circuit is turned on and off as the case may be, during the operation of the IC card. Additionally, there can be eliminated the wait time due to the rise time of the oscillating circuit, and overlooking of the keyed-in data. These features improve the reliability of the IC card, and elongates its lifetime.

In the above-mentioned embodiments, a predetermined period of time must be elapsed from the start of the CPU, before the clock frequency is changed from low to high. Alternatively, such a clock frequency change may be performed only when the decoding of the first input key signal shows that the operation mode is the continuous mode.

In the above-mentioned embodiments, the IC card is used for the portable medium, but it may be replaced by any device if it has the data memory and the control element, and is selectively accessible from external. Further, the shape of the device is not limited to the card-like shape, but may be a bar.

As seen from the foregoing, the present invention may successfully provide a portable medium in which the proper processings, e.g., to limit the validity of period, and to use it as the key for encoding, are possible.

Furthermore, this invention can provide a portable medium which can accept the signal input from any key even if oscillator does not stably operate.

What is claimed is:

1. A portable medium comprising:
   input means;
   display means for displaying the contents as input by said input means;
   control means for controlling said input means and said display means;
   first clock means for providing time, said time being displayed by said display means, change of the contents of the time by said input means being allowed; and
   second clock means for providing time, displaying of the time by said display means being prohibited, change of the contents of the time by said input means being prohibited.

2. The portable medium according to claim 1, wherein the contents of the time of said second clock means are common to all other portable medium.

3. The portable medium according to claim 2, wherein the contents of said second clock means are the standard time.

4. The portable medium according to claim 1, wherein the contents of the time of said first and second clock means are second, minute and hour.

5. The portable medium according to claim 1, wherein said second clock means is used for limiting the effective period of the corresponding portable medium.

6. The portable medium according to claim 1, wherein said second clock means is used as at least a part of the key for encoding when the input data from said input means is encoded and displayed by said display means.

7. The portable medium according to claim 1, wherein said second clock means is used for the entire key for encoding when the input data from said input means is encoded and displayed by said display means.

8. The portable medium according to claim 1, further comprising timepiece clock generating means for constantly generating a low-frequency clock signal, and wherein said first and second clock means count time by counting the clock signal generated by said timepiece clock generating means.

9. The portable medium according to claim 8, further comprising:
   high-frequency clock generating means for generating a high-frequency clock signal; and
   clock control means for, when said control means is driven, supplying to said control means a low-frequency clock signal derived from said timepiece clock generating means, causing said high-frequency clock generating means to generate a clock signal, and after a predetermined period of time, supplying to said control means the high-frequency clock signal generated by said high-frequency clock generating means, in place of the low-frequency clock signal from said timepiece clock generating means.

10. The portable medium according to claim 9, wherein said predetermined period of time ranges from an instant said high-frequency clock generating means starts its operation till said high-frequency clock generating means generates a stable high-frequency clock signal.

11. The portable medium according to claim 9, wherein said control means is driven by the input signal from said input means.

12. The portable medium according to claim 9, wherein said control means is a CPU.

13. A portable medium comprising:
   storing means for storing transaction data and the date of the term of validity of said portable medium;
   input means for inputting the data according to a transaction;
   first clock means for counting the time, said first clock means being able to change the contents of time, according to the input from said input means;
   display means for displaying the data input by said input means, and the time counted by said first clock means;
   second clock means for providing time, the displaying of the time by said display means being prohibited, change of the contents of the time by said input means being prohibited; and
   control means for changing the data for transaction stored in said storing means according to the data input by said input means, and for deciding whether or not the term of validity of said portable medium stored in said storing means has expired, on the basis of the contents of the time of said second clock means.

14. The portable medium according to claim 13, wherein said storing means also stores the present date;
   said control means updates the present date stored in said storing means, according to the contents of the time of said second clock means, compares the updated date with the date of the term of validity as read out, and decides whether or not the term of validity has expired, on the basis of the comparison result.

15. The portable medium according to claim 13, wherein said control means causes said display means to display the termination of the validity term, when the term of validity expires.

16. The portable medium according to claim 13, further comprising:
   timepiece clock generating means for constantly generating a low-frequency clock signal, said first and second clock means counting time by counting the clock signal generated by said timepiece clock generating means;
   high-frequency clock generating means for generating a high-frequency clock signal; and
   clock control means for, when said control means is driven, supplying to said control means a low-frequency clock signal derived from said timepiece clock generating means, causing said high-frequency clock generating means to generate a clock signal, and after a predetermined period of time, supplying to said control means the high-frequency clock signal generated by said high-frequency clock generating means, in place of the low-frequency clock signal from said timepiece clock generating means.

17. The portable medium according to claim 16, wherein said predetermined period of time ranges from an instant said high-frequency clock generating means starts its operation till said high-frequency clock generating means generates a stable high-frequency clock signal.

18. The portable medium according to claim 16, wherein said control means is driven by the input signal from said input means.

19. A portable medium, having controller means and power supply means for supplying power to the controller means, comprising:
   first clock generating means, for generating a low-frequency clock signal;
   second clock generating means, for generating a high-frequency clock signal; and
   clock control means for, when said control means is driven, supplying to said controller means a low-frequency clock signal derived from said first clock generating means, causing said second clock generating means to generate a clock signal, and after a predetermined period of time, supplying to said controller means the high-frequency clock signal generated by said second clock generating means, in place of the low-frequency clock signal from said first clock generating means, thereby to operate said controller means.

20. The portable medium according to claim 19, further comprising:
   key-in means having a key for driving said controller means.

* * * * *